United States Patent [19]

Garrick

[11] 4,083,147
[45] Apr. 11, 1978

[54] AUTOMATED PLANTER BOX SYSTEM

[76] Inventor: Laurence James Garrick, Box 699, Woodstock, N.Y. 12498

[21] Appl. No.: 741,564

[22] Filed: Nov. 15, 1976

Related U.S. Application Data

[63] Continuation-in-part of Ser. No. 689,604, May 24, 1976, abandoned, which is a continuation of Ser. No. 553,146, Feb. 26, 1975, abandoned, which is a continuation of Ser. No. 483,174, Jan. 30, 1974, abandoned.

[51] Int. Cl.² .............................................. A01G 27/00
[52] U.S. Cl. ........................................... 47/80; 137/397
[58] Field of Search ................ 47/66, 68, 79, 80, 81, 47/18, 85; 137/397

[56] References Cited

U.S. PATENT DOCUMENTS

| | | | |
|---|---|---|---|
| 668,767 | 2/1901 | Bird | 47/81 |
| 917,381 | 4/1909 | Twiford | 47/79 |
| 1,231,975 | 7/1917 | Weitzel | 47/79 |
| 1,983,806 | 12/1934 | Norman | 47/18 |
| 2,072,185 | 3/1937 | Schein | 47/81 |
| 2,084,005 | 6/1937 | Richards | 47/80 |
| 2,145,052 | 1/1939 | Lund | 137/397 |
| 2,463,719 | 3/1949 | Schackett et al. | 47/66 |
| 2,605,588 | 8/1952 | Lindstaedt | 47/79 |
| 2,743,552 | 5/1956 | Hunter | 47/79 |
| 2,818,877 | 1/1958 | Swanson | 137/135 |

FOREIGN PATENT DOCUMENTS

| | | | |
|---|---|---|---|
| 1,393,533 | 2/1965 | France | 47/81 |
| 830,581 | 7/1949 | Germany | 47/79 |
| 2,017,100 | 10/1970 | Germany | 47/85 |

*Primary Examiner*—Edgar S. Burr
*Assistant Examiner*—James R. Feyrer
*Attorney, Agent, or Firm*—Barry G. Magidoff

[57] ABSTRACT

This invention provides an automated planter system comprising a planter unit having an outer container and an inner container, the inner container being supported interiorly of the outer container. A lower portion of the inner container is porous to the flow of liquid which is held in the intermediate space between the two containers. The intermediate space provides a water table volume and humidifying space and is open to the space above the inner container.

The water level within the intermediate space is regulated by a valve which is set to open when the water reaches a first low water level and to close when the water reaches a second high water level. The high water level is above the porous portion of the inner container and the low water level is below the porous portion. The automated planter thus provides the necessary alternate wet and dry periods for any plants growing within the inner container.

The planter system also provides for a series of modular units in fluid flow connection wherein the water levels in the intermediate space of all units is controlled by a single valve means.

13 Claims, 6 Drawing Figures

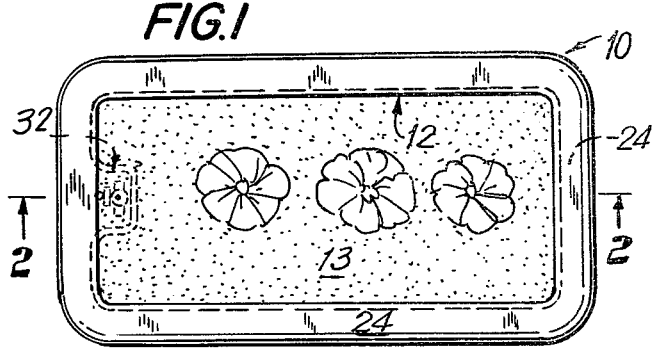
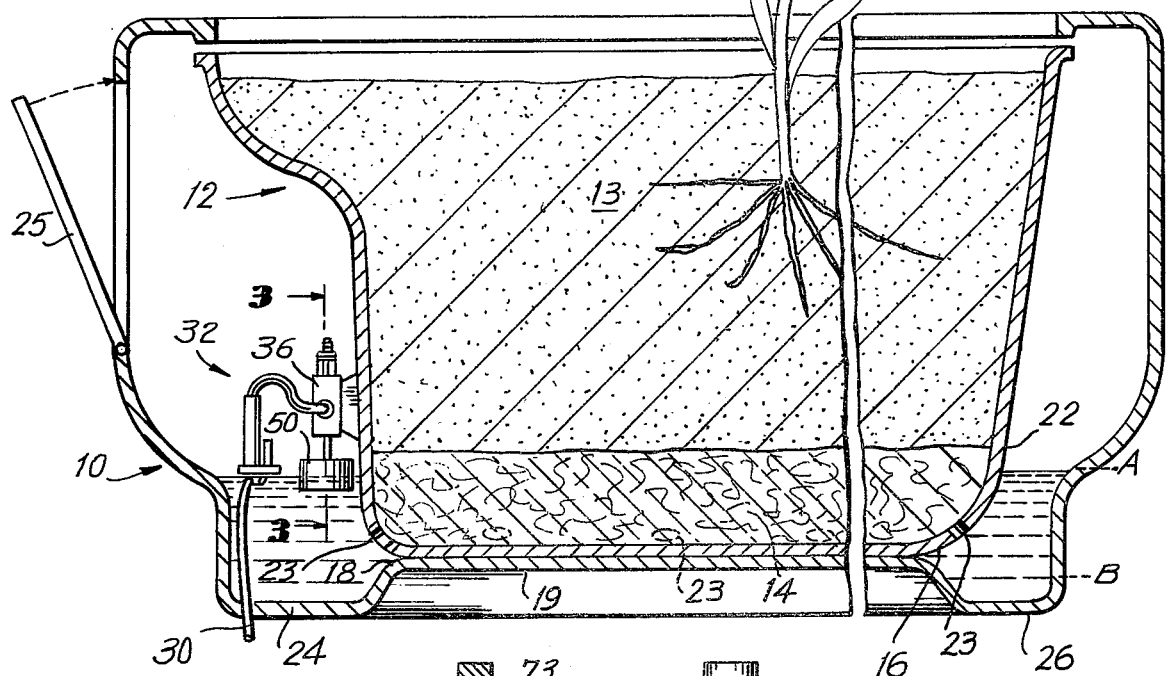
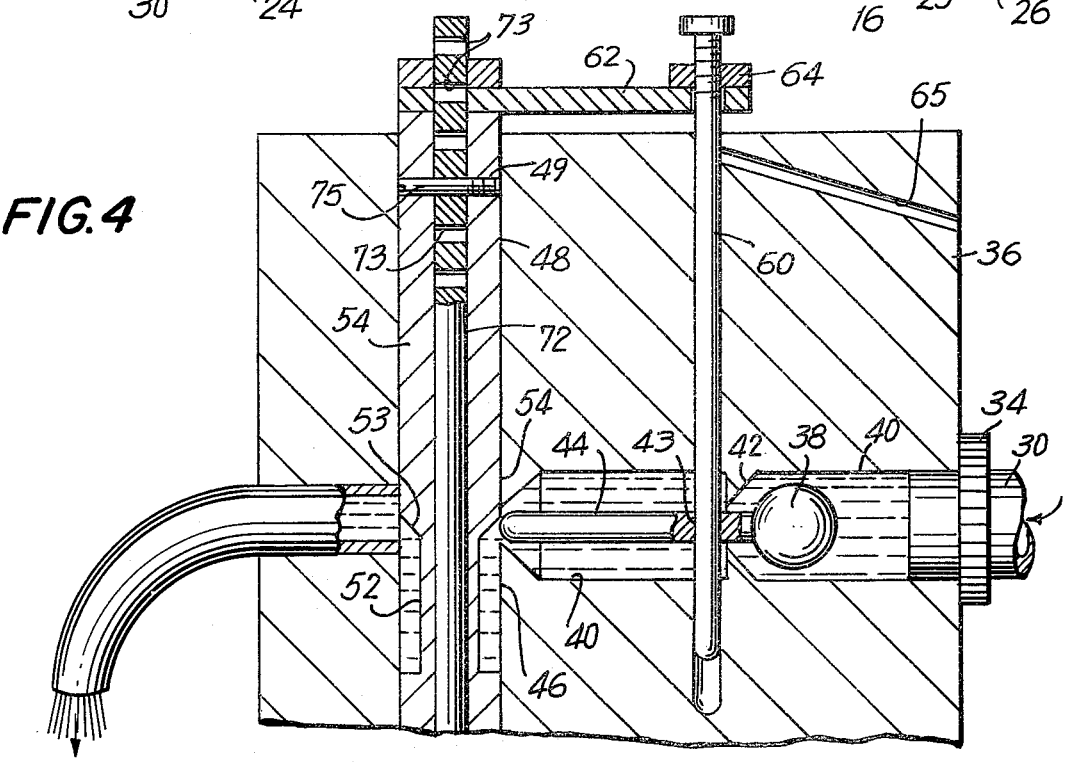

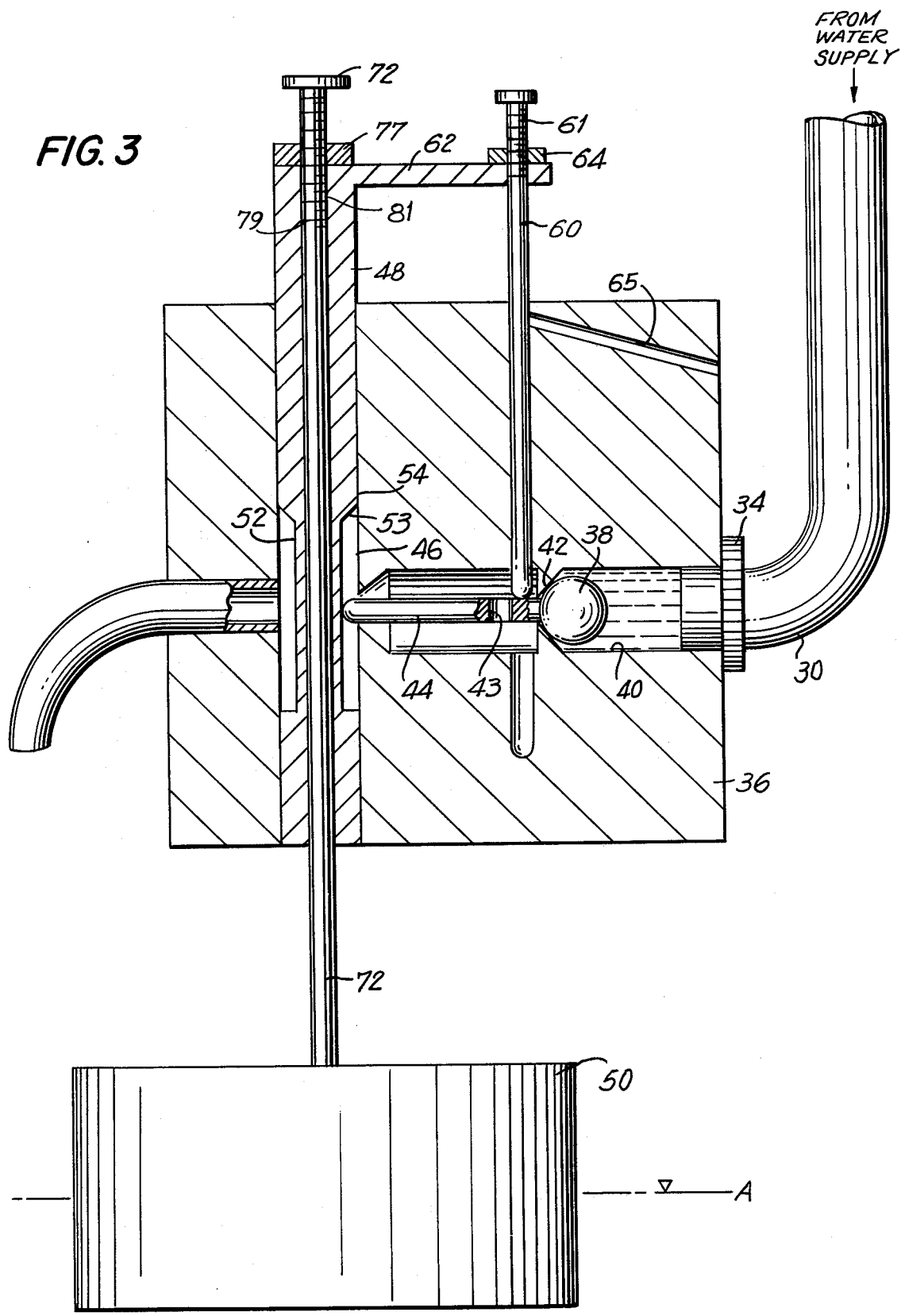

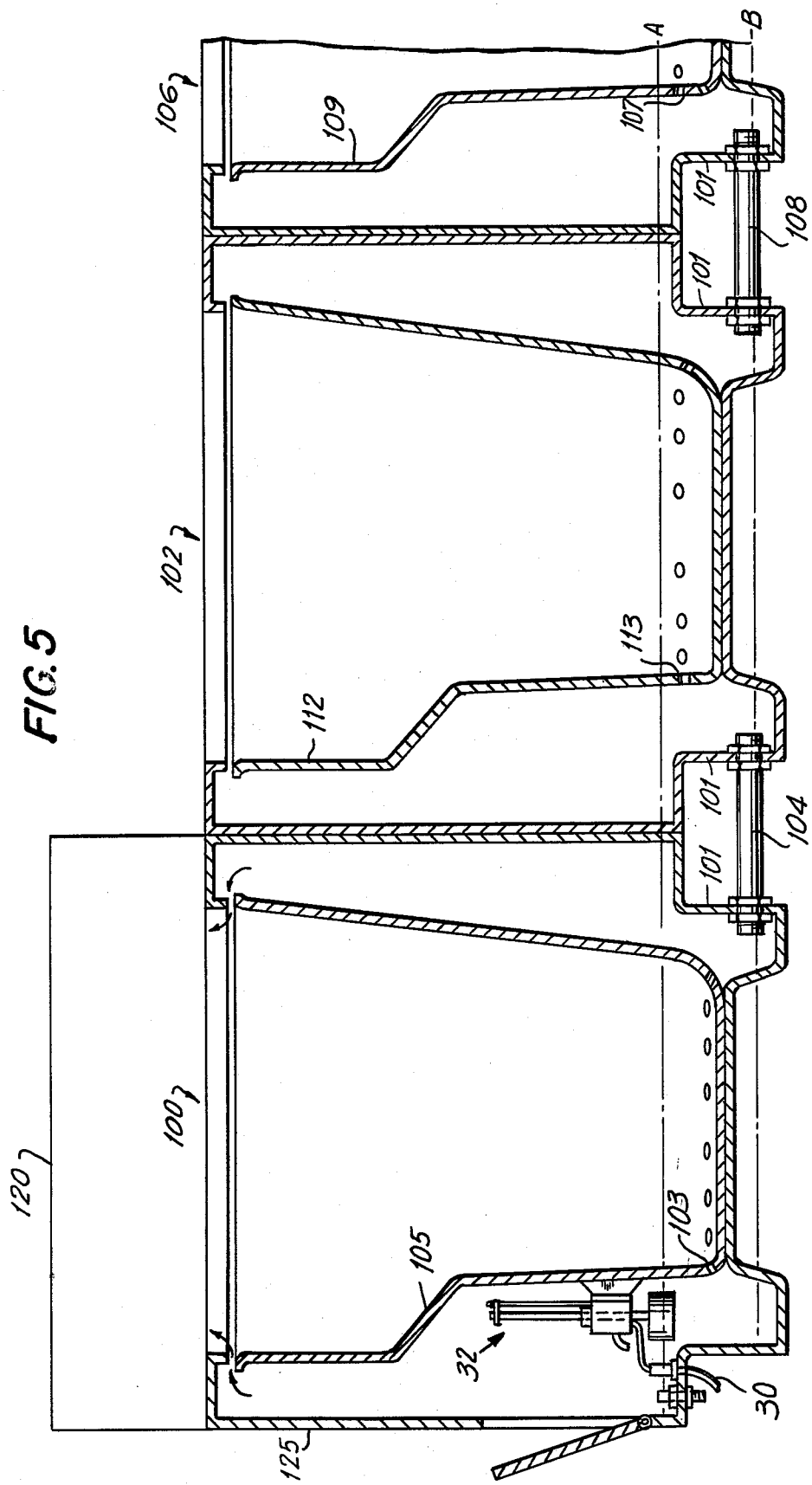

AUTOMATED PLANTER BOX SYSTEM

This is a continuation-in-part of Ser. No. 689,604, filed May 24, 1976, which is a continuation of Ser. No. 553,146, filed Feb. 26, 1975, which in turn, was a continuation of Ser. No. 483,174, filed Jan. 30, 1974, all of which are now abandoned.

Modern technological advances have resulted in the progressive automation of everyday human existence. This is especially true in the modern city office buildings. In a multi-story, even 100-story high structure, there is often not one window which can be opened to admit unfiltered untreated fresh air. Such huge structures are usually completely conditioned, not only to warm or cool air, depending upon the seasons and the temperature, but also to in other ways treat the air, for example, by filtering out harmful particulate matter and adding or removing moisture to result in a more comfortable humidity level inside of the structure. An unwanted side result of this technological advance is an almost sterile psychological environment, where men feel, and become, separated from a natural existence. A further, and even more contemporary problem, is the huge expense of energy to attain this artificial environment with a diminution of natural chemical fuel supply throughout the planet. The need for a more efficient, less costly system for maintaining a comfortable internal environment necessary for the carrying out of work by modern men throughout any season of the year has become desirable, and even necessary. Further, the psychological effect of the wholly artificial environment has also begun to be noted and this, perhaps even more significant, effect, must be counted. In many office buildings, as well as residence structures, the use of indoor "potted" vegetation, i.e. the common potted plant, has been used to bring back into the artificial environment some semblance of the natural order of existence. This, however, has often resulted in the problem of maintenance of the plant systems and quite often this responsibility, which is only indirectly related to the profitable operation of any commercial enterprise, is not carried out faithfully by those employees assigned the task. In other places, there is not even a direct assignment made for the care of such plants and it is left to a wholly volunteer staff member.

Accordingly, it is an object of the present invention to provide a system in which growing plants can continue to grow and flourish without the requirements of continuing human supervision and without fear that the plants would perish for want of their necessary elements.

There have previously been provided to the art various automated irrigating systems for both potted plants and plants growing in the natural soil. Such devices include, for example, the automated system of Richards in U.S. Pat. No. 2,445,717, which includes an outer container and an inner container held therewithin, the annular space between the inner and outer container forming a reservoir for water. The space below the inner container and the bottom of the outer container is separated from the annular space by a valve which is operated by a detector system for determining the water content of the soil in the inner container. Water is transmitted to the soil in the inner container from the lower section via porous material extending into the lower chamber. The device permits the soil to be wetted during a portion of a cycle; then, as the water level in the lower chamber drops to below the level at which it contacts the porous material, the soil is permitted to dry to a predetermined value, which is sensed by the valve-operatng mechanism, which then opens the valve into the lower chamber, permitting the chamber to be refilled and to once again wet the soil. This serves to give the soil the natural wet and dry cycles which are met by plants in their natural state and which are otherwise accomplished by the periodic manual watering methods. The device for sensing the moisture of the soil is understandably complex and requires careful placing and continual care to insure that it is in fact operating to sense the actual average moisture of the soil in which the plants are growing. Also see U.S. Pat. No. 2,084,005, also to Richards.

In accordance with the present invention, an automated planter system is provided comprising an outer nonporous container; an inner container, supported interiorly of the outer container and having lower portions thereof porous to water; the intermediate space between the inner and the outer containers providing a water table volume and humidifying space; the outer container extending vertically above the inner container and the intermediate space being open to the space vertically above the inner container; fluid conduit means extending through the outer container and into the intermediate space; valve means in the conduit means to open and close the conduit means to fluid flow; sensing means within the intermediate space to sense the level of liquid in the intermediate space; and operating means for opening and closing the valve, activated by the sensing means, whereby the valve is open when the liquid level in the intermediate space is below an adjustable predetermined level below the porous lower portions of the inner container and the valve is closed thereafter when the liquid level reaches a higher, also adjustable, predetermined level, thereby to effect alternate wetting and drying of any soil in the inner container.

Generally, both the inner and the outer containers are open at the top and have only side and bottom wall surfaces. If desired, however, the outer container can be enclosed above so as to provide a terrarium effect for the plants within the inner container. The openness of the outer container to the atmosphere, or to the interior of the terrarium atmosphere, provides for the evaporation of water in the intermediate space and further provides for the humidification of the atmosphere immediately surrounding the plants in the inner container; thus, even if a terrarium top, which is usually a transparent glass or plastic covering extending above the surface of the inner and outer containers, is not present, the evaporation of the water from the intermediate space provides a local humidifying effect on the atmosphere immediately surrounding the plants. The evaporation further permits the desired wetting and drying cycles by causing a lowering of the water level within the intermediate space, by evaporation, to below the point at which it will be in contact with the porous portion of the inner container. The period of time beginning when the water level drops to below the porous portion until the water level reaches its adjustable lowest level determines the extent to which the soil is permitted to dry before it is rewetted by raising the water level to above the porous portion, to its adjustable highest level.

It is further possible, in accordance with the present invention, to utilize a series of interconnected modular units each having an inner and an outer container, in fluid connection with a supply of water under pressure via a single valve means. The individual units can be identical or of different volumetric sizes. Furthermore, the individual units can provide different vertical relationships between the porous inner container and the outer container, whereby plants requiring different degrees of continuing wetness can be grown utilizing a single control valve. The depth of the inner container relative to the intermediate space water level determines the wet-dry cycle to which the plant in each modular unit is to be subjected.

These and other aspects of the present invention become readily apparent from the following description of exemplary embodiments of the invention defined herein with reference to the accompanying drawings.

FIG. 1 is a plan view of an automated planter box system according to the present invention;

FIG. 2 is a cross-section taken along lines 2—2 of FIG. 1;

FIG. 3 is an enlarged vertical cross-section of a portion of FIG. 2, showing an example of a valve, in a closed position, suitable for use in the present invention;

FIG. 4 is view of a part of the valve of FIG. 3, showing the valve in an open position;

FIG. 5 is a vertical cross-section along the longitudinal axes of a series of modular automated planter units in accordance with the present invention.

Figure 6:
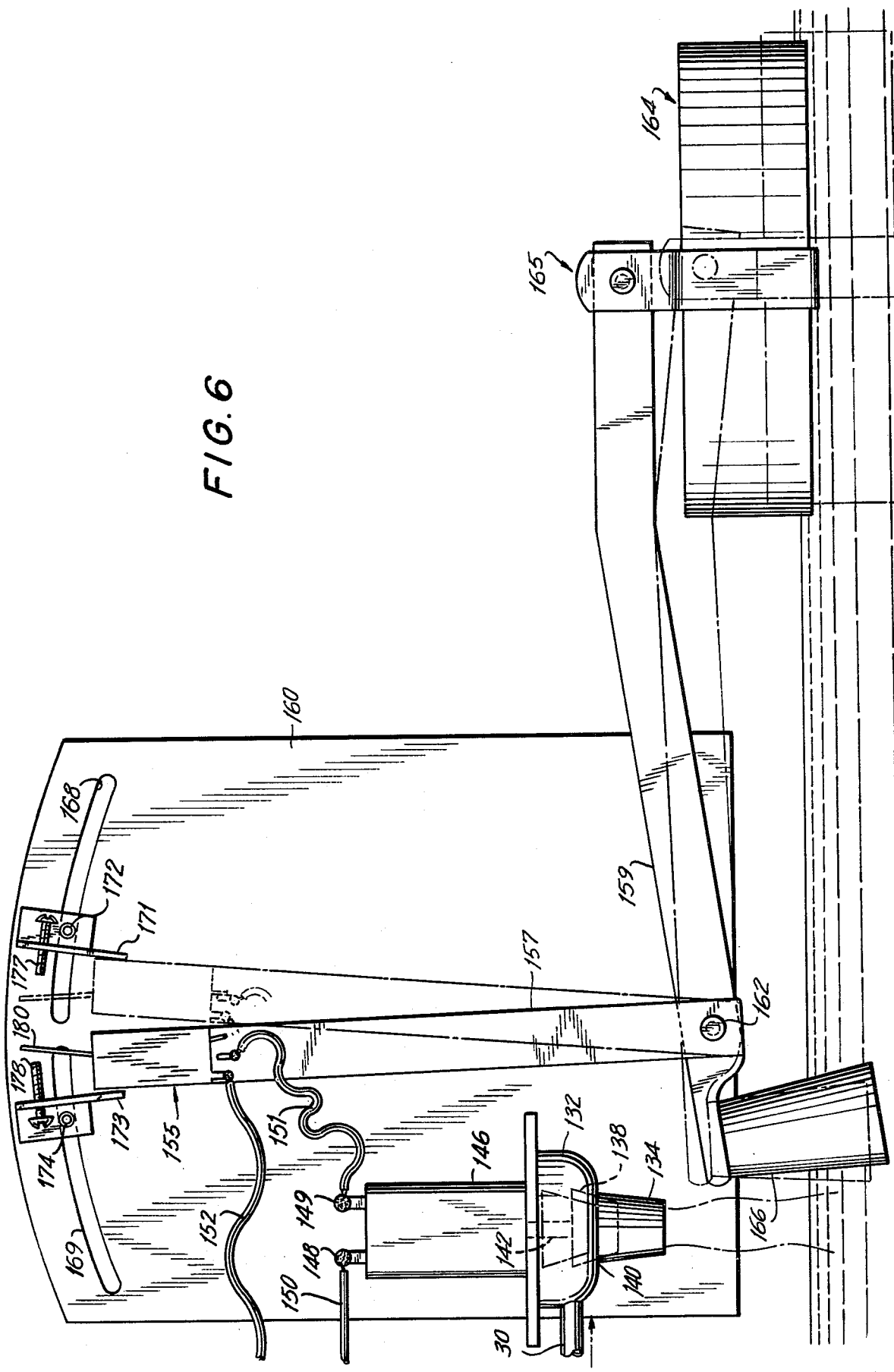
FIG. 6 is a diagrammatic view of a portion of FIG. 2, showing a second example of a valve.

Referring to FIGS. 1 and 2, there is provided an outer container, generally indicated by the numeral 10, and an inner container wholly within the outer container 10, the inner container generally indicated by numeral 12. The inner container 12 is filled with planting soil 13 located above a lower porous layer of fiberglass or gravel chips 14. The inner container is supported by the central portion 19 of the bottom surface 18 of the outer container 10. The containers are each molded as a single unit. The bottom of the sides 22 of the inner container 12 is porous; in the embodiment shown in FIG. 2, a series of small pores, or apertures, 23 are formed therethrough. The outer container 10 is made substantially non-porous, but is provided with a hand-hole covered by a removable plate 25 in one end wall thereof.

Further, as shown, the bottom of the outer container 10, lower surface 18, is not level, but rather is concave in its center section to form an upwardly extending island 19 (supporting the inner container 12) and a deeper annular portion 24, which serves as legs upon which the entire structure stands. The annular space 24 contains water after the center island 19 and the porous portion 22 of the inner container 12 are completely dry.

A conduit 30 extends from an aperture through the lower portion of the outer wall of the outer container 10, connecting the intermediate space between containers 10 and 12 to a reservoir, or source of water, under pressure, e.g. a water main. Valve and sensing, or control means, generally indicated by the numeral 32, are attached to the exterior of the inner wall 22 and the valve is in fluid flow connection with the conduit 30.

One example of a suitable sensing and valve means is shown in FIGS. 3 and 4. As shown in FIGS. 3 and 4, conduit 30 is connected by threaded gasket member 34 to a channel, defined by surface 40, through a valve block 36. A valve member 38, in this case a steel ball, is slidably placed within the channel defined by surface 40. The valve member 38 seals against valve seat 42. Valve member 38 is biased against valve seat 42 by the line pressure in conduit 30, exerted in the direction indicated by the arrow.

A valve actuating member 44 extends horizontally from one end of valve member 38 and has a hole 43 drilled therethrough perpendicular to its longitudinal axis. The valve actuating member 44 extends through the channel 40 in valve block 36 into a vertical channel defined by the surface 46. Slidably held within the vertical channel 46 is a cylindrical, tubular cam member 48 operably connected to a float 50. The cam member 48 is freely slidable, vertically, within the channel 46 and includes an intermediate portion 52 having a reduced diameter and an upper portion 54; an angled surface 53 connects the upper portion 54 and intermediate portion 52.

A float rod 72 extends centrally through the tubular cam member 48 and is rigidly attached to the float 50, extending below the valve means 32, in the annular volume 24. The float rod 72 is provided with a series of holes 73 therethrough, formed perpendicular to its axis and the cam 48 is provided with a matching hole formed perpendicularly therethrough, having internal threads 49 at one end thereof. The float rod 72 is fixedly connected to the cam 48 by a threaded pin passing through a hole 73 through the float rod 72, which is in juxtaposition with the threaded hole 49 through the cam 48. (See FIG. 4)

A locking rod 60, threaded at its upper end 61, extends through another vertical channel through valve block 36 and is in contact with valve actuating member 44. The juxtaposition of the locking rod 60 and the valve actuator 44 is such that when the valve 38 is moved away from valve seat 42 the locking rod 60 passes into and through the aperture 43 in the valve actuator 44 thus locking the valve 38 in an open position (FIG. 4). The relationship between valve actuating member 44 and cam 48 is such that when cam 48 is in a raised position (FIG. 3), the narrower portion 52 is juxtaposed with the actuating member 44. As the cam 48 drops to a lower level (FIG. 4), the actuator 44 is juxtaposed with the wider upper portion 54 of cam 48, which pushes against the actuator 44, which in turn moves valve member 38 out of contact with valve seat 42 to a position where the high water adjustor 60 falls into and through aperture 43.

A connecting arm 62 is rigidly connected with the cam 48 and slidably connected with the locking rod 60. Threaded adjusting nut 64 is threadedly connected to the top 61 of the locking rod 60. Lubricating port 65 is provided for the locking rod 60.

In operation, conduit 30 is connected to a reservoir of water under pressure. Generally, this can be the water main supplying the building in which the automated planter is located. Initially, the water in the intermediate space between the outer container 10 and inner container 12 is filled to the high water mark indicated, for example, by the letter "A" in FIGS. 2 and 3. This is above the level of the openings through the lower portion 20 of the inner container 12, so that water flows into the inner container, through the porous layer of fiberglass or gravel 14, soaking the soil 13 from the bottom. The float 50 rests upon the surface of the water in the intermediate space and rises vertically as the water level rises. This, in turn, moves cam member 48 vertically until it reaches a position that the valve actuator 44 is juxtaposed with the narrow portion 52 of the cam 48 and the connecting arm 62 acts against the adjusting nut 64 and raises the locking rod 60 vertically out of engagement with the opening 43 in valve actuator 44; this releases the valve member 38 such that the water pressure in the line from conduit 30 pushes the valve 38 against valve seat 42 thus blocking further flow of liquid into the intermediate space through the channel 40. The locking rod 60 is lubricated in its conduit in the valve block 36 by water passing through lubricating channel 65.

As the water is absorbed through the openings in inner container 12 into the porous layer 14 and then into the soil material 13, the water level in the intermediate space gradually drops to below the bottom of the interior container 12. At this point, water ceases to enter the openings 20 and the soil 13 in the inner container 12 enters a drying portion of the cycle. The soil is gradually permitted to dry as the water level in the intermediate space gradually falls by evaporation of water which escapes through the gap between the upper portions of the outer container 10 and the inner container 12. The rate of evaporation is generally known, especially in the modern environmentally controlled office buildings, wherein both temperature and humidity are maintained substantially constant throughout most of the year. Thus the period of time required for the water level in the intermediate space to drop a given distance below the bottom of the lower container 22 is known and thus the period of the drying cycle can be determined by setting the level at which the valve 38 will be reopened.

As the water level drops, the float drops vertically, bringing the angled intermediate portion 53 of cam 48 into engagement with the valve actuator 44. This gradually moves valve 38 away from valve seat 42 until the point is reached again when actuator 44 is in contact with the broader portion 54 of the cam 48, moving the valve actuator 44 and valve 38 away from the valve seat and bringing the adjustor rod 60 into and through the aperture 43, thus locking valve 38 in the open position. As the water passes through valve 42, and out conduit 65 into the intermediate space, the water level in the intermediate space rises, bringing float 50 upwardly, thus moving the cam 48 upwardly until the actuator 44 is once again juxtaposed against the narrower portion 52 of cam 48. The valve 38 cannot move forward, however, because of the blocking action of rod 60 until the water level reaches a point at which the connecting arm 62 acts vertically against adjusting nut 64, causing the locking rod 60 to move vertically out of engagement with the aperture 43, thus permitting the valve once again to be moved forwardly against valve seat 42. Thus alternate wetting and drying cycles are provided for the soil, much as is met with in the natural state by plants.

The period of each wetting and drying cycle can be adjusted for each type of plant in an automatic planter by setting the high-water level at which the valve 38 is closed and the low water level at which the valve 38 is opened. The high water level is determined by the distance between the adjustor nut 64 and the lower end of the locking rod 60. This can be varied by merely raising and lowering the adjustor nut 64 along the threaded end of the locking rod 60.

The low water level, at which the actuator 44 initially contacts the angled portion 53 of the cam 48, is determined by the distance, along the rod 72, between the top of the float 50 and the bottom of the cam 48. This distance can be varied by sliding the float rod 72 relative to the cam 48 and then locking the cam 48 and rod 72 in the desired position.

In FIG. 4, there is shown one method of changing the relationship between the rod 72 and the cam 48, in discrete, or discontinuous, steps, by juxtaposing one of the holes 73, bored through the rod 72, with the threaded hole 49 in the cam 48 and locking the two into the desired position by passing a threaded pin 75 through the cam and the rod.

An alternative system, for varying the relationship in a continuous manner, is shown in FIG. 3. The upper end of float rod 72 has external threads 79 and the upper end of the longitudinal bore through the cam 48 has internal threads 81. Rotating the float rod 72 causes continuous vertical movement of the rod 72 relative to the cam 48, until the desired position of the float is achieved. The rod 72 and cam 48 can be locked into position by the use, for example, of locking nut 77, threadedly connected to the rod 72; movement is prevented by screwing the locking nut 77 down tightly against the upper end of the cam 48.

Thus the high water level and the low water level can be adjusted so as to be at a certain distance above and below, respectively, of the porous portion of the inner container 12, thus determining the wetting and drying cycles for the plants in the inner planter box 12.

When a variety of different plants, requiring different wetting and drying cycles are to be grown, a series of modular planter units, such as shown in FIG. 5, can be connected, all controlled by a single adjusting valve 32, but providing different periods of wetting and drying cycles for the plants contained therein. This effect is obtained by providing different depth ratios between the inner and outer containers in each modular unit. For example, referring to FIG. 5, the modular unit generally indicated by numeral 100, is in fluid flow connection with the modular unit generally indicated by numeral 102, via conduit 104, connected to the lower portion of the side-wall 101 of each of the outer containers of the respective modular units; the modular unit 102 is in turn in fluid flow connection with a third modular unit, indicated by numeral 106, via a conduit 108, also connected to the lower portions of the sides of the respective outer containers. The conduits 104 and 108 should be connected to each unit below the low water level.

Only the first modular unit 100 is connected, via conduit 30, to a reservoir of water; however, when water is permitted to enter the first modular unit 100, water passes through the conduits 104 and 108, thus filling the outer containers of the units 102 and 106 to the same level. However the porous portion of the side wall 113 of the interior container 112 of the second modular unit 102 is at a level below the porous portion of the side wall 103 of the inner container 105 of the first modular unit 100; and the porous portion of the side wall 107 of the inner container 109 in the third modular unit 106 is at a level above that of the inner container in either of the first and second modular units 100 and 102. Thus there are three separate wetting and drying cycles obtained in the three modular units. The wet cycle is respectively greatest in the first modular unit 100, respectively shortest in the third modular unit 106, and an intermediate wet period is obtained for the second modular unit 102. Similarly, the drying time is shortened or lengthened respectively.

A similar effect can be obtained for modular units, without changing the level of the porous wall portions of the inner container by providing capillary means extending downwardly from the porous wall portions of the inner container so as to contact water even when the water level has dropped below the porous portion. Thus, by making a single modular unit, but providing as an accessory the capillary material, a variety of wetting and drying cycles can be obtained by the modular units with the greatest economy.

Further as shown in FIG. 5, one of the modular units 100 includes a terrarium top 120 which maintains a relatively high humidity above the plants in the planter box. The humidity is obtained not only from moisture evaporating directly from the soil, but also, even during a dry cycle, by moisture passing through the space indicated by the arrows between the top of the inner container 106 and outer container 125 from the evaporation of the water in the intermediate space. It should be noted that even when a terrarium top is not present, a locally higher humidity level is maintained around the plants by this continuing evaporation; this is especially true in the interior of buildings, where the movement, or circulation, of air is relatively slow. The humidity effect can be heightened, without a terrarium top, by extending upwardly the side walls of the outer container above the level of the plants therein.

Therefore, in accordance with the present invention, an automated planter has been provided having a water table maintained within the intermediate space between an inner and an outer container which water table raises and lowers during a complete cycle so as to provide both wet and dry periods required by plants. The water table is connected to a reservoir which is preferably the water main supplying the building in which the planter is to be located, and a relatively simple valve mechanism is provided which sets the high and low water level within the intermediate space. The height and depth of the water level being determined by the time of the evaporation, which in turn can be predetermined, based upon the average humidity of the environment in which the planter is located.

A second example of a suitable sensing and valve means for the automated planter box is shown in FIG. 6. This second example comprises an electrically-operated valve, but one which provides the necessary wetting and drying cycles for the plants by permitting a high-water level and a low-water level, which can be adjusted, as desired, independently of each other.

Referring to FIG. 6, conduit 30 is threadedly connected to a valve chamber 132. The chamber 132 is also provided with an outlet opening 134 extending therebeneath, so as to permit passage of liquid from the valve body 132 into the intermediate space between containers 10 and 12. A valve member 138 is shown in the closed position, seated against a valve seat 140 in a manner so as to prevent passage of fluid from the valve body 132 outwardly through the outlet 134. Valve member 138 is biased closed against valve seat 140 by the line pressure from conduit 30, exerted in the direction indicated by the arrow. The valve member 138 is connected via rod 142 to an electrically operated solenoid valve Actuator 146. A bushing, not shown, serves to seal off the liquid in valve chamber 132 from the interior of solenoid valve Actuator 146. The solenoid valve 146 is of a conventional vertically-operating type, the construction of which is not shown, but which is well known to the art, and the mechanism of which does not itself form a part of this invention.

Electrical power, to operate the solenoid valve Actuator 146, is carried through terminals 148 and 149 via electrical leads 150 and 151 and 152. Leads 150 and 152 are connected to a power source, for example, a 24 volt AC power source, not shown. The other end of terminals 152 and 151 are each connected to a switch member, diagrammatically indicated on the drawings and identified generally as numeral 155. The switch is carried on a pendulum member 157 rigidly connected to a crossbar 159, the crossbar 159 and pendulum 157 are pivotally connected to the base plate 160 by pin 162. The base plate 160 is rigidly connected to an interior wall of the intermediate space between containers 10 and 12. One end of horizontal bar 159 is pivotally connected to a float 164 by a hinged joint, generally indicated as 165. The second end of the bar 159 is connected to a counterweight 166.

Slots 168 and 169 are formed towards the upper portion of plate 160 at a location above the upper end of pendulum rod 157. The slots 168, 169 are formed in the shape of the arc of the circle, centered upon the pin 162. The plate member 171 is slidably connected through slot 168 via threaded member 172, so as to permit the plate 171 to be moved lengthwise along slot 168. Similarly, plate member 173 is slidably connected through slot 169 via threaded member 174. A machine screw 177 is threadedly connected through plate 171 and a second machine screw 178 is threadedly connected through plate 173. A switch-activating pin 180 protrudes upwardly from the upper end of the switch 155, at the end of rod 157, in a manner so as to contact the machine screws 177, 178 when the side of the pendulum rod 157 contacts the respective plate 171, 173.

In operation, the conduit 30 is connected to a source of water supply, generally under pressure, and the leads 150, 152 are connected to a source of 24 volt AC current. The intermediate space within the containers 10, 12 is empty of water, such that the float 164 is in the lower position indicated by the phantom lines in FIG. 6, the pendulum rod is in the position adjacent plate 171, also shown in phantom lines, and the activating pin 180 is moved towards the left, after having struck against the machine screw 177. The movement of the activating pin 180 to the left operates the activating switch 155, so as to close a circuit connection and thus operate the solenoid valve 146, so as to retract the valve head 138 into its upper, open, position, indicated by the phantom lines in FIG. 6. This permits water to pass from conduit 30 and valve chamber 132 through outlet 134 into the intermediate space, filling it until the float 164 is in the upper position, pendulum rod 157 has moved adjacent plate 173 and activating pin 180 has been snapped towards the right, after having contacted machine screw 178. This opens the circuit by activating the switch 155, thus causing the valve 138 to be moved to the closed position, as indicated, thus shutting of the flow of water through outlet 134 and setting the upper level of the water.

The activating switch 155 can be any conventional type of device, but preferably is a device known as an over-center switch, which is readily available in the market.

The upper water level, when the valve 146 is placed into the closed position, is located above the openings through the lower portion 20 of the inner container 12 so that water flows into the inner container, thus soaking the soil 13 on the bottom thereof, in the same manner as described above. As the water level is thus lowered, due to a combination of evaporation and utilization by the plant from the soil, the valve float is lowered, again moving the pendulum rod 157 towards the right, until the lowermost level of the water is reached, that is desired, at which point the float is dropped down sufficiently low that pendulum rod 157 has moved once again sufficiently far to the right to have pin 180 contact machine screw end 177, and be snapped to the left, thus reactivating the solenoid valve 146, causing the raising of the valve body 138 via rod 142, to permit water flow through the valve body 132 and out exhaust 134.

The minimum height and the maximum height of the water within the intermediate chamber can be varied, as desired, in order to attain the desired length of wet and dry periods, by manipulation of the position of plates 171 and 173 and the ends of machines screws 177 and 178. The movement of plates 171 and 173 is obtained by loosening the threaded members 172, 174, respectively, to enable the plates 171, 173 to be slidably moved along the slot openings 168, 169, respectively. The farther to the right plate 171 is moved, the shallower can be the depth of water in the chamber, and therefore, the greater the length of the dry spell. Similarly, the farther to the left the plate 173 is moved, the higher can be the maximum level of the water in the intermediate chamber, and therefore, the longer the wet spell. The machine screw members 177, 178 provide desired "fine tuning" of the permitted variation of maximum height and minimum height, where desired. That is, the plate 171 can be set at a given location and then the machine screw 177, e.g., can be adjusted by being moved inwardly or outwardly through its threaded opening in plate 171 to obtain a finer adjustment as to the height of the water at either its minimum, for example. The minimum or maximum height, can each be independently adjusted in accordance with the present invention, without affecting the other.

The electrically operated valve means in accordance with FIG. 6 herein, provides the desired wet and dry cycles, in accordance with the same reasons pointed out above for the valve means of FIGS. 3 and 4.

The claimed embodiments of this invention are:

1. An automated planter system comprising a planter unit including an outer container open at the top; an inner container open at the top, supported interiorly of, and spaced away from the sides of, the outer container, a bottom porous portion of the inner container, being porous to the flow of water between the outer container and the inner container, the porous portion being spaced above the bottom of the outer container; the outer lateral surface of the inner container and the inner lateral surface of the outer container defining an intermediate space extending from the bottom of the outer container to the top of the outer container, providing a water table volume and humidifying space and being open to the space above the inner container; the outer container extending vertically above the inner container;

fluid conduit means extending into the outer container for placing the intermediate space in fluid flow connection with a reservoir of water under pressure;

valve means in the conduit means designed and adapted to open and close the conduit means to fluid flow into the intermediate space; and wet-dry cycling means to effect alternating wetting and drying cycles for any soil contained in the inner container, the cycling means comprising:

sensing means within the intermediate space designed to sense a lower first level of liquid in the intermediate space located below the porous bottom portion and a higher second level located above the porous bottom portion; and adjustable operating means for opening and closing the valve, activated by the sensing means, and designed to open the valve means when the liquid level in the intermediate space reaches the predetermined first level, and to close the valve means when the liquid level reaches the higher second level, whereby the length of the dry cycle is determined by the rate of evaporation of water escaping through the upper opening from the intermediate space and the distance the first level is beneath the porous bottom portion.

2. The automated planter of claim 1, wherein the sensing means comprises a float, the float being operatively connected to the operating means.

3. The automated planter system of claim 1, comprising in addition a transparent terrarium top extending above the outer container and covering the inner and the outer container.

4. The automated planter system of claim 1, wherein the outer container comprises side walls and a bottom surface, the bottom surface having an upwardly extending central portion, the upwardly extending central portion being in contact with and supporting the inner container.

5. The automated planter system of claim 4, wherein the side walls of the outer container are designed and adapted to extend above the level of any vegetation growing within the inner container.

6. The automated planter system of claim 1, comprising in addition at least one additional modular unit comprising an outer container and a porous walled inner container, the modular unit having an intermediate space defined between the inner container and the outer container, the intermediate space of the modular unit being in fluid flow connection with the intermediate space of the planter unit.

7. The automated planter system of claim 6, wherein the porous portion of the walls of the inner container of the modular unit is at a different level than the porous portion of the walls of the inner container of the planter unit.

8. The automated planter system of claim 1, wherein the valve means is electrically operated to the opened position, and wherein the adjustable operating means comprises an electrical switch for opening and closing the circuit powering the valve means, and further comprising connecting means between the sensing means and the switch is actuated to a first position, opening the valve, when the sensing means determines that the water has reached a desired minimum level within the intermediate space, and whereby the switch is moved to a second position, causing the closing of the valve, when the sensing means indicates that the water level in the intermediate space is at a desired maximum level.

9. The automated planter system of claim 8, further comprising means for adjustment of the minimum level and the maximum level at which the switch is activated to the open and closed positions.

10. The automated planter system of claim 9, wherein the electrical switch comprises a snap-type of mechanism, whereby when the sensing means indicates a minimum desired water level, the switch is snapped into the first position, and when the sensing means indicates a maximum water level, the switch is snapped into the second position.

11. The automated planter system of claim 8, wherein the valve is biased into the closed position.

12. The automated planter system of claim 11, wherein the electrical power connection to the valve is opened when the sensing means indicates a maximum position, whereby the valve is moved into the closed position by the action of the bias means.

13. An automated planter system comprising a planter unit including an outer container open at the top; an inner container open at the top, supported interiorly of, and spaced away from the sides of, the outer container, the bottom portion of the inner container having a series of apertures formed therethrough adapted to permit the flow of liquid between the outer container and the inner container, the apertures being spaced above the bottom of the outer container, the outer lateral surface of the inner container and the inner lateral surface of the outer container defining an intermediate space extending from the bottom of the outer container to the top of the outer container, providing a water table volume and humidifying space and being open to the inner space above the inner container; the outer container extending vertically above the inner container, the upper portion of the outer container, above the inner container, extending inwardly towards but spaced above the inner container, whereby the gap formed between the top of the inner container and the portion of the outer container directly above the inner container faces towards the space above the inner container, the intermediate space being continuous with the space above the inner container via the gap;

fluid conduit means extending into the outer container for placing the intermediate space in fluid flow connection with a reservoir of water under pressure;

valve means in the conduit means designed and adapted to open and close the conduit means to fluid flow into the intermediate space;

sensing means within the intermediate space to sense the level of liquid in the intermediate space; and adjustable operating means for opening and closing the valve, activated by the sensing means, whereby the valve is open when the liquid level in the intermediate space is below a predetermined level and the valve means is thereafter closed when the liquid level reaches a different higher, predetermined level, thereby to effect alternating wetting and drying cycles for any soil contained in the inner container, while maintaining a humid atmosphere above such soil.

* * * * *